(12) United States Patent
Chermside (10) Patent No.: US 11,657,033 B2
(45) Date of Patent: May 23, 2023

(54) SYSTEMS AND METHODS FOR MAINTAINING DATA QUALITY IN A DATA STORE RECEIVING BOTH LOW AND HIGH QUALITY DATA

(71) Applicant: Capital One Services, LLC, McLean, VA (US)

(72) Inventor: Michael Chermside, Ardmore, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 31 days.

(21) Appl. No.: 17/072,438

(22) Filed: Oct. 16, 2020

(65) Prior Publication Data

US 2022/0121645 A1 Apr. 21, 2022

(51) Int. Cl.
*G06F 16/23* (2019.01)
*G06F 16/25* (2019.01)
*G06F 16/21* (2019.01)
*G06F 16/178* (2019.01)

(52) U.S. Cl.
CPC ...... *G06F 16/2365* (2019.01); *G06F 16/1794* (2019.01); *G06F 16/219* (2019.01); *G06F 16/258* (2019.01)

(58) Field of Classification Search
CPC .. G06F 16/2365; G06F 16/219; G06F 16/258; G06F 16/1794
See application file for complete search history.

(56) References Cited

U.S. PATENT DOCUMENTS

| | | | |
|---|---|---|---|
| 6,560,598 B2 | 5/2003 | Delo et al. | |
| 7,996,413 B2 | 8/2011 | Cotichini et al. | |
| 9,606,747 B2 | 3/2017 | Adkins et al. | |
| 10,372,762 B1* | 8/2019 | Hudak | G06F 16/90335 |
| 2005/0182739 A1 | 8/2005 | Dasu et al. | |
| 2006/0129594 A1 | 6/2006 | Ernst et al. | |
| 2012/0197887 A1* | 8/2012 | Anderson | H03M 7/30 |
| | | | 707/736 |
| 2013/0055042 A1 | 2/2013 | Za'noun et al. | |
| 2016/0092290 A1* | 3/2016 | Gerstl | G06F 11/0787 |
| | | | 714/37 |

* cited by examiner

*Primary Examiner* — Alford W Kindred
*Assistant Examiner* — Lin Lin M Htay
(74) *Attorney, Agent, or Firm* — Troutman Pepper Hamilton Sanders LLP; Christopher J. Forstner; John A. Morrissett (57) ABSTRACT

The disclosed systems and methods may receive a data record from either a legacy data source or a modern data source and determine whether the record satisfies a first set of validation rules. When the record fails to satisfy the first set of rules, reject the record for storage in a data store. When the record satisfies the first set of rules, determine whether the record satisfies a second set of validation rules. When the record satisfies the second set of rules, store the record in the data store with an indicator that the record satisfies the all rules. When the record fails to satisfy the second set of rules, if the source was a modern data source reject the record, and if the source was a legacy data source store the record in the data store with an indicator that it fails to satisfy the second set of rules.

9 Claims, 7 Drawing Sheets

SYSTEMS AND METHODS FOR MAINTAINING DATA QUALITY IN A DATA STORE RECEIVING BOTH LOW AND HIGH QUALITY DATA

FIELD OF INVENTION

The present disclosure relates to maintaining data quality in a data store receiving both low- and high-quality data.

BACKGROUND

It is desirable for a new data store to enforce high quality data standards by enforcing validity checks whenever a record is inserted or updated. Quality standards enforced by other means (e.g., user interface) tend not to be effective. However, if legacy data records from legacy data stores are to be imported into the new data store, it is desirable to do so without first correcting poor-quality data which may be impossible or expensive to do. Additionally, the legacy data stores likely contain some legacy data records that do not satisfy high quality data standards and legacy data systems are likely to generate records that also may not satisfy high quality data standards.

Accordingly, there is a need for improved systems and methods to hold data to stricter standards while simultaneously integrating legacy data that cannot satisfy the stricter standards. Embodiments of the present disclosure are directed to this and other considerations.

SUMMARY

Disclosed embodiments provide systems and methods for maintaining data quality in a data store with low quality data.

The system may include one or more processors and a memory in communication with the one or more processors and storing instructions that, when executed by the one or more processors, are configured to cause the system to perform steps of a method. The method may include receiving a legacy data record (e.g., a customer record containing an address) from a legacy data source for storage in a modern data source. The method may include determining whether the legacy data record (e.g., a customer record containing an address) satisfies a first set of validation rules (e.g., the zip code of the address must contain only digits). In cases where the legacy data record fails to satisfy the first set of validation rules, the method may reject the legacy data record for storage in the modern data store. In cases where the legacy data record satisfies the first set of validation rules, the method may include determining whether the legacy data record satisfies a second set of validation rules (e.g., the zip code is valid for the state where the address is located). In cases where the legacy data record fails to satisfy the second set of validation rules, the method may include store the legacy data record with an indicator that indicates the legacy data record does not satisfy the second set of validation rules in the data store. In cases where the legacy data record satisfies the second set of validation rules, the method may include storing the legacy data record in the data store with an indicator indicating the legacy data record satisfies the first set of validation rules and the second set of validation rules.

The method may further include receiving a modern data record (e.g., customer record containing an address) from a modern data source. The method may include determining whether the modern data record satisfies the first set of validation rules (e.g., the zip code of the address must contain only digits). In cases where the modern data record fails to satisfy the first set of validation rules, the method may include rejecting the modern data record for storage in the modern data store. In cases where the modern data record satisfies the first set of validation rules, the method may include determining whether the modern data record satisfies the second set of validation rules (e.g., the zip code is valid for the state where the address is located). In cases where the modern data record fails to satisfy the second set of validation rules, the method may include rejecting the modern data record for storage in the data store. In cases where the modern data record satisfies the second set of validation rules, the method may include storing the modern data record in the data store with an indicator that indicates the modern data record does satisfy the first set of validation rules and the second set of validations rules.

The system may include one or more processors and a memory in communication with the one or more processors and storing instructions that, when executed by the one or more processors, are configured to cause the system to perform steps of a method. The method may include receiving one or more records from a variety of source systems with different capabilities and determining for each record of the one or more records whether the record satisfies a series of validation rulesets. In cases where the record satisfies the entire series of validation rulesets, storing the record in a data store with an indicator that the record satisfied the series of validation rulesets. In cases where the first ruleset of the series of validation rulesets which is not satisfied is within the intended capabilities of the source system the record was received from, rejecting the record for storage in the data store. And in cases where the first ruleset of the series of validation rulesets which is not satisfied is not within the intended capabilities of the source system the record was received from, storing the record in the data store with an indicator of which validation rulesets of the series of validation rulesets the record satisfied.

Further features of the disclosed systems, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1:
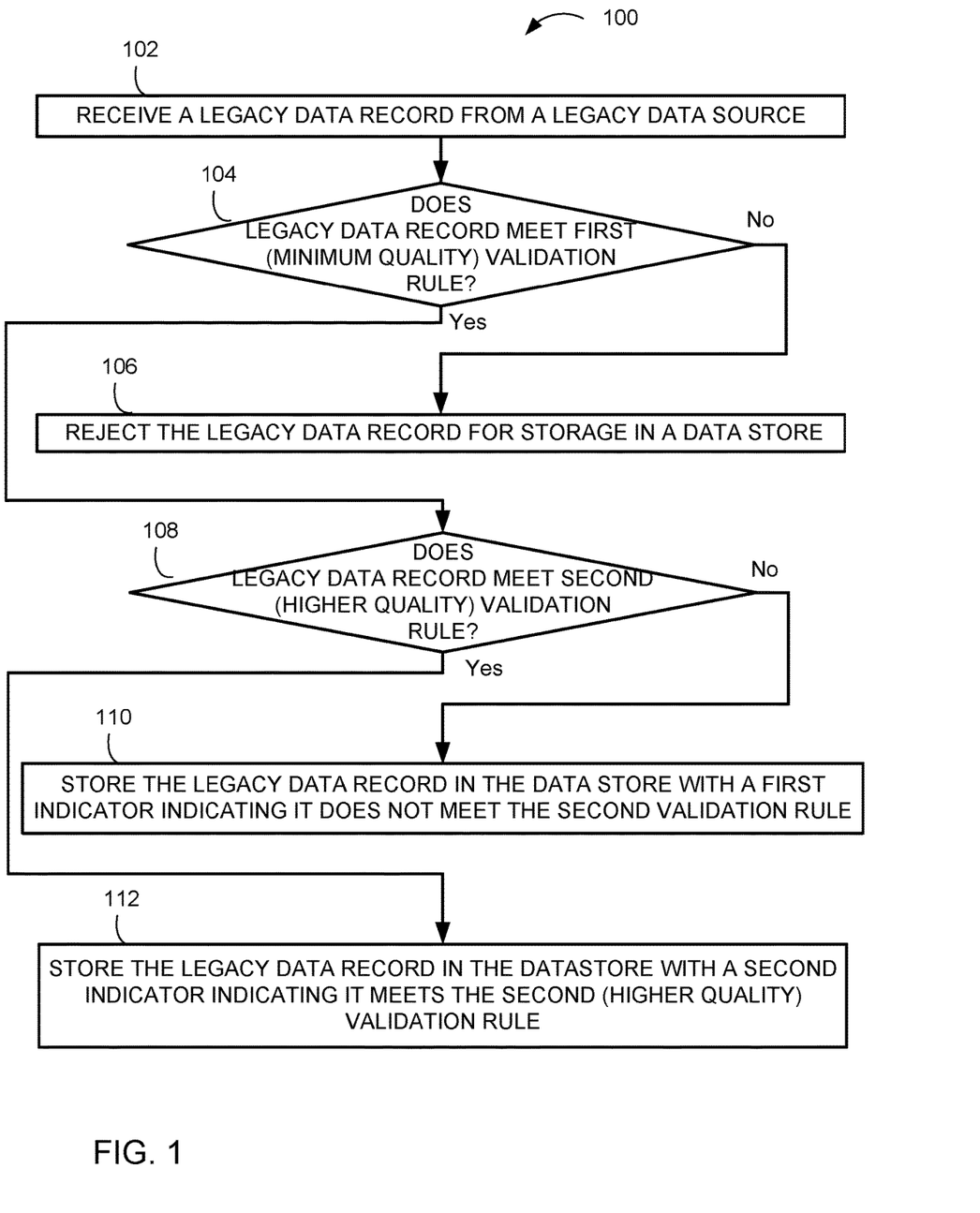
FIG. 1 is a flowchart of an exemplary method for processing legacy data records with two sets of validation rules for a data store.

FIG. 1 is a flowchart of an exemplary method 100 for processing legacy data records with two validation rules for a data store. Method 100 may be performed by a system (e.g., data validation system 420 described in more detail with respect to FIGS. 4 and 5 below) which may be, for example, an API server used to access the modern database 516.

In block 102, the data validation system 420 may receive a legacy data record from a legacy data source. For example, a legacy database may contain customer records including an address for each customer. The legacy data record may be a new record that does not exist in the data store and is imported from the legacy data source (e.g., a legacy database or application). The "legacy data record" may also include or be a modification to an existing record, made by a legacy system.

In block 104, the data validation system may determine whether the legacy data record satisfies a first (and most basic) validation rule. For example, the legacy data record may contain an address and the first validation rule require that the zip code field of the address contain only digits. In cases where the data validation system 420 determines that the legacy data record fails to satisfy the first validation rule, proceed to block 106. For example, if the first validation rule requires that the zip code field contain only digits, a legacy data record containing letters would cause the legacy data record to be rejected. In cases where the data validation system 420 determines that the legacy data record satisfies the first validation rule, proceed to block 108. For example, if the first validation rule requires that the zip code field contain only digits and the legacy data record contains only digits the system would proceed to block 108.

In block 106, the data validation system 420 may reject the legacy data record for storage in a data store after the data validation system 420 determines (in block 104) that the legacy data record fails to satisfy the first validation rule. For example, if the first validation rule requires that the zip code field contain only digits and the zip code field if the legacy data record contains letters, the data validation system 420 will reject it for storage. In other words, the data validation system 420 will not store the legacy data record in the data validation database 516.

In block 108, the data validation system 420 may determine whether the legacy data record satisfies a second (more rigorous) validation rule. For example, the legacy data record may contain an address and the second validation rule require that the zip code of the address be a valid zip code located within the US state of the address. In cases where the data validation system 420 determines that the legacy data record fails to satisfy the second validation rule, proceed to block 110. In cases where the data validation system determines that the legacy data record satisfies the second validation rule, proceed to block 112.

In block 110, the data validation system 420 may store the legacy data record in the data store with a quality field indicating the legacy data record does not satisfy the second validation rule (rigorous or higher quality validation). For example, if the legacy data record may correspond to a customer record containing an address and the second validation rule require that the zip code of the address be a valid zip code located within the US state of the address, while the legacy data record may contain a valid zip code located in a different state, which means that the legacy data record does not satisfy the second, higher quality, validation rule. Thus, the data validation system 420 would set an indicator in the data record when storing it into the modern database 516.

In block 112, the data validation system 420 may store the legacy data record in the data store with the indicator indicating the data record does satisfy the second validation rule (rigorous validation). Thus, the data validation system 420 may store the legacy data record into the modern database 516 with a quality field indicating the data record satisfies the more rigorous validation standard. Observe that the legacy record was rejected (106) if completely malformed, else it was stored (110 or 112) along with an indicator of whether it satisfies the rigorous validation standard.

Figure 2:
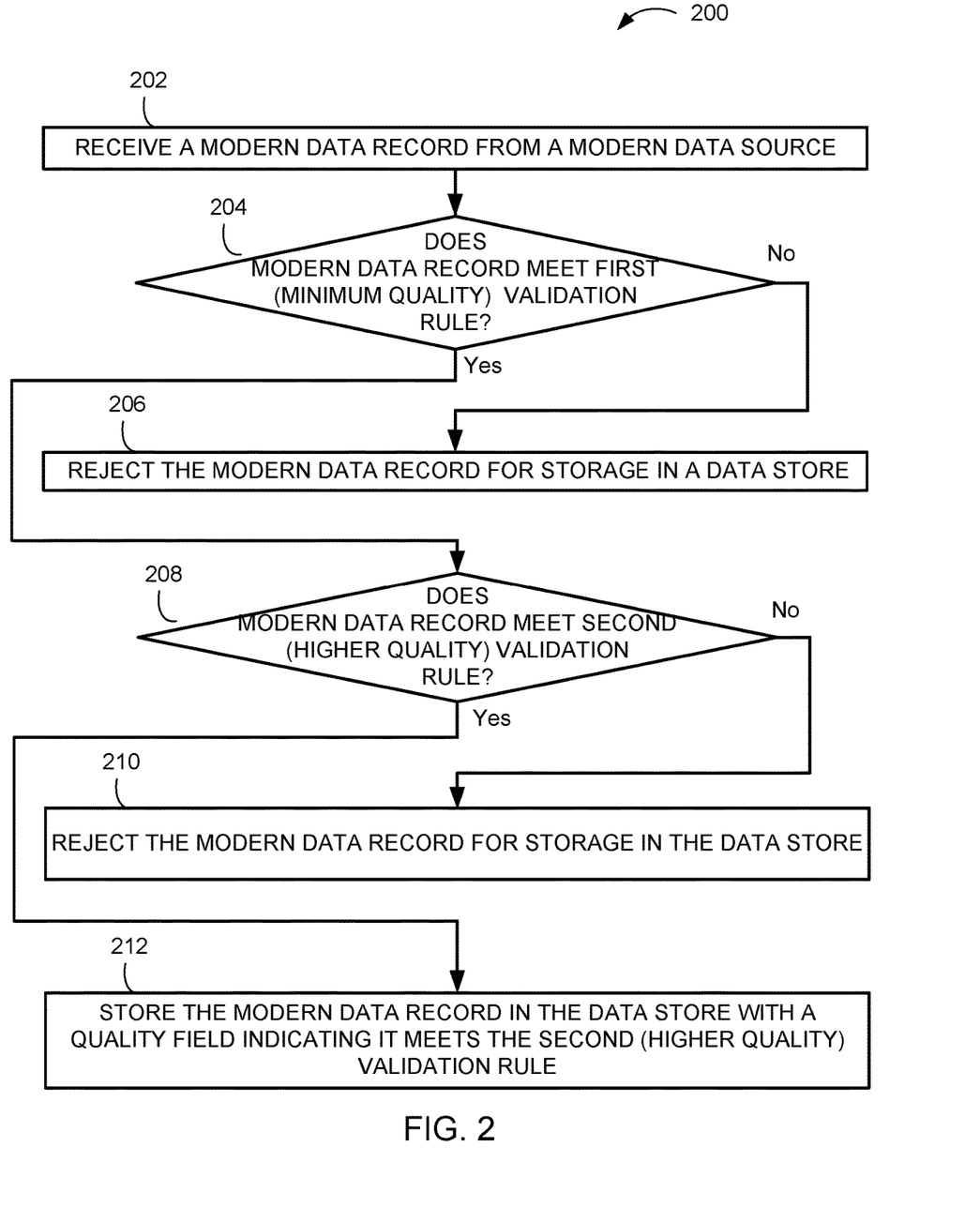
FIG. 2 is a flowchart of an exemplary method for processing modern data records with two sets of validation rules.

FIG. 2 is a flowchart of an exemplary method 200 for processing legacy data records with two validation rules for a data store. Method 200 may be performed by a system (e.g., data validation system 420 described in more detail with respect to FIGS. 4 and 5 below) which may be, for example, an API server used to access the modern database 516.

In block 202, the data validation system 420 may receive a modern data record from a modern data source. For example, the data validation system 420 may be an API server used to access the modern database 516. It may receive a data record from a modern system which may be the current new customer application system. The modern data record may be received from the modern data source (e.g., a modern database or application) in real time or in batch. The "modern data record" may also include or be a modification to an existing record, made by a modern system. Observe that we will use a slightly different flow in FIG. 2, instead of the flow in FIG. 1 used for legacy data records, because this record comes from the modern system which is presumed to be capable of satisfying more rigorous standards.

In block 204, the data validation system 420 may determine whether the modern data record satisfies the first (and most basic) validation rule. In cases where the data validation system 420 determines that the modern data record fails to satisfy the first validation rule, proceed to block 206. In cases where the data validation system 420 determines that the modern data record satisfies the first validation rule, proceed to block 208.

In block 206, the data validation system 420 may reject the modern data record for storage in the data store after the data validation system 420 determines that the modern data record fails to satisfy the first validation rule.

In block 208, the data validation system 420 may determine whether the modern data record satisfies a second (more rigorous) validation rule. In cases where the data validation system 420 determines that the modern data record fails to satisfy the second validation rule, proceed to block 210. In cases where the data validation system 420 determines that the modern data record satisfies the second validation rule, proceed to block 212.

In block 210, the data validation system 420 may reject the modern data record for storage in the data store. Observe that this differs from the flow in FIG. 1 where a legacy data record was accepted for storage under similar circumstances. Because the modern data source, unlike the legacy source, is capable of satisfying the higher quality standard, the data validation system 420 enforces that for the modern system.

In block 212, the data validation system 420 may store the modern data record in the data store (e.g., modern database 516) with a quality field or indicator indicating the data record does satisfy the second validation rule (rigorous validation). Observe that the modern data record was stored 212 if it met the rigorous validation standard or rejected (206 or 210) if it fails to satisfy either validation. In this manner, the validation system 420 can enforce high quality data standards for data from modern systems yet still allow low quality data from legacy systems unable to satisfy that standard, and at the same time track which records satisfy the higher standard and enforce at least minimal standards for all sources.

Figure 3:
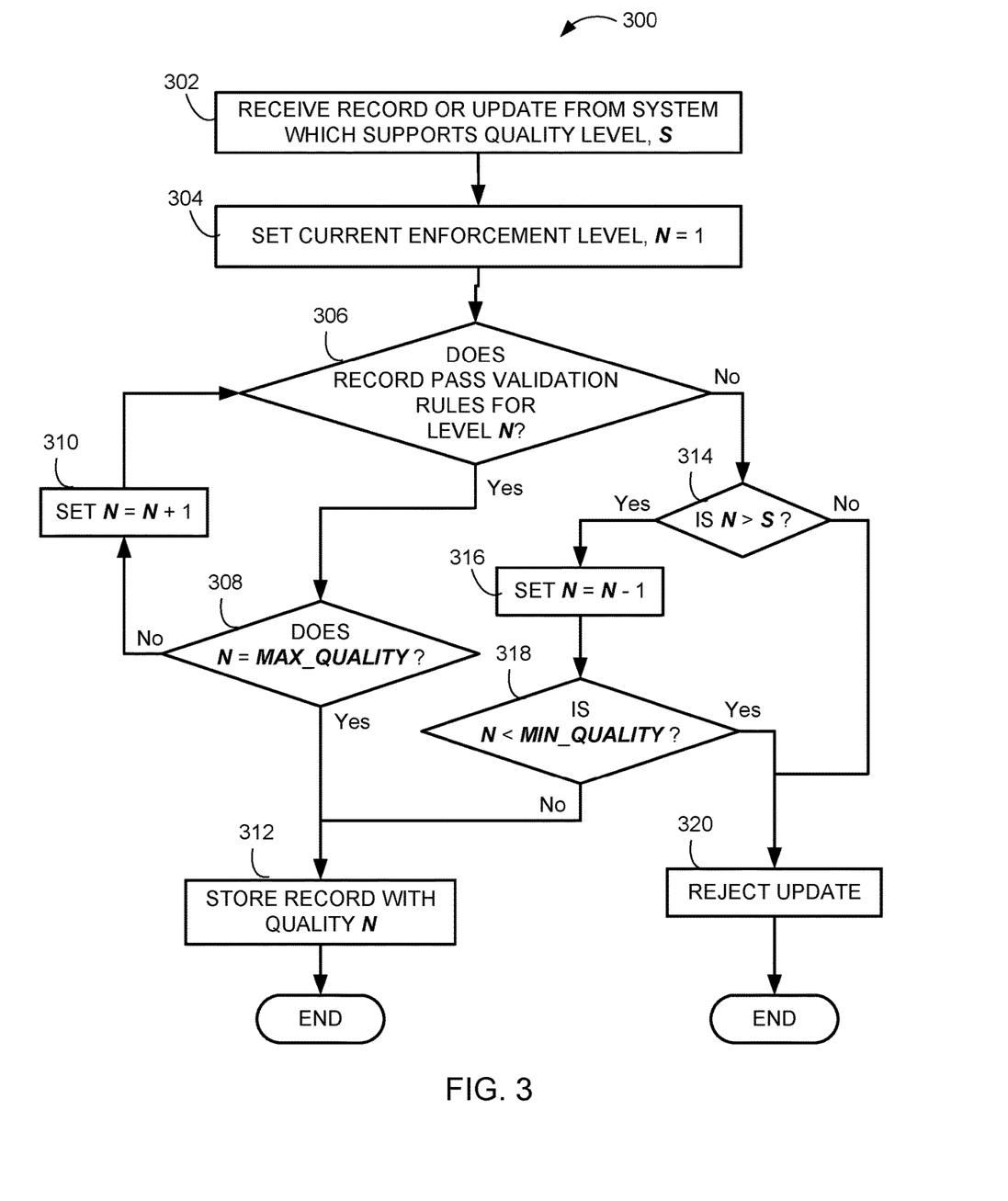
FIG. 3 is a flowchart of a further exemplary method for processing data records from systems with a variety of capabilities and applying multiple levels of validation before recording them in a data store.

FIG. 3 is a flowchart of another exemplary method for processing a data record with an arbitrary number of different levels of validation rules prior to storing it in a data store. The record may be supplied by different data sources that are capable of supporting different levels of validation. Method 300 may be performed by a system (e.g., a data validation system 420 described in more detail with respect to FIGS. 4 and 5 below). Observe that this is a similar to the combination of methods 100 and 200, but generalized to an arbitrary number of different quality levels instead of just two (legacy and modern).

For the flow in FIG. 3, the validation rules are divided into a series of different levels of validation, numbered 1 through MAX_QUALITY. These may represent a strictly increasing series of quality levels that a data record might satisfy. The validation rules might apply to single fields or they might apply across fields of the record. For example, the data record might contain an address and a 1st level validation rule may include verifying that the zip code does not contain any non-numeric characters like letters or emojis. A 2nd level validation rule for this record may include verifying that the zip code field is not empty. A 3rd level validation rule for this record may include verifying that the zip code field is a valid zip code for the state of the address. A 4th level validation rule for this record might include verifying that the entire address exists within the USPS address list.

In block 302, the data validation system 420 may receive a data record from a system which supports some quality level, S. The value of S may depend on which system is providing the new record or update to an existing record. For example, a record imported from a legacy database might only be able to guarantee satisfying quality level 1, while an update to a record performed by a servicing application may be able to satisfy quality level 3 and updates from the customer-facing website may run though a full USPS validation so that system is capable of supporting quality level 4. Observe that the method allows for integration with systems that exhibit a diverse range of capabilities.

In block 304, the data validation system 420 may set the current enforcement level, N, to 1.

In block 306, the data validation system 420 may determine whether the data record satisfies the validation rules for level N. In cases where the data validation system 420 determines that the data record satisfies the level N validation rules, proceed to block 308. In cases where the data validation system 420 determines that the data record does not satisfy the level N validation rules, proceed to block 314.

In block 308, the data validation system 420 may test whether N is equal to MAX_QUALITY. MAX_QUALITY is the highest level of validation rules that currently exist in the system. For example, if there were 4 levels of validation rules ranging from level 1 through level 4 rules, then MAX_QUALITY would be 4. In cases where the data validation system 420 determines that N=MAX_QUALITY, proceed to block 312. In cases where the data validation system 420 determines that N does not equal MAX_QUALITY, proceed to block 310.

In block 310 the data validation system 420 may set N to one more than its current value. For example, if N were currently 2 then N would be changed to 3. After completing block 310, the system will proceed to block 306 to evaluate the rules for this new level. Observe that we loop though each level of rules in order until the data record either passed all levels of rules and we proceed to block 312 or it fails a level of rules and we proceed to block 314.

In block 312, the data validation system 420 may store the record along with an indicator that the record satisfies quality level N. It may store it in a data store 516.

In block 314, the data validation system 420 may test whether N>S. N is the level of rules that just failed, and S is the level of rules that the source system ought to be able to support. In cases where the data validation system 420 determines that N>S, proceed to block 316. In cases where the data validation system 420 determines that N is not greater than S, proceed to block 320. Observe that this effectively checks whether the validation that just failed is one that the source system claims to be able to support (in which case we will end up rejecting the update) or one that the source system does not claim to be able to support (in which case it will end up being written to the database along with an indicator of the highest level of validation that it satisfies).

In block 316, the data validation system 420 may set N to one less than its current value. For example, if N were currently 1 then N would be changed to 0. After completing block 316, the system will proceed to block 318. Observe that we have now set N to 0 or to the highest level of validation rules that the data record PASSED.

In block 318, the data validation system 420 may test whether N<MIN_QUALITY. MIN_QUALITY is the lowest level of quality that is permitted in the database. This will typically be 1, meaning that the database necessarily rejects only updates that fail the lowest level of validation (level 1), but MIN_QUALITY can instead be set to −1 (to accept all data records no matter how malformed) or to a higher level (to ensure a minimum level of quality in the database). In cases where the data validation system 420 determines that N is not less than MIN_QUALITY proceed to block 312. In cases where the data validation system 420 determines that N<MIN_QUALITY proceed to block 320. At this point process 300 may be complete.

In block 320 the data validation system 420 may reject the update. For example, if the data validation system 420 is an API server, the API could return an error to its caller (the system entering the data). Observe that the rejected record will either fail to satisfy the minimum quality standards for the data store 516 or it will satisfy those but fail to satisfy the minimum quality standards S that the source system claimed to be able to support.

Figure 4:
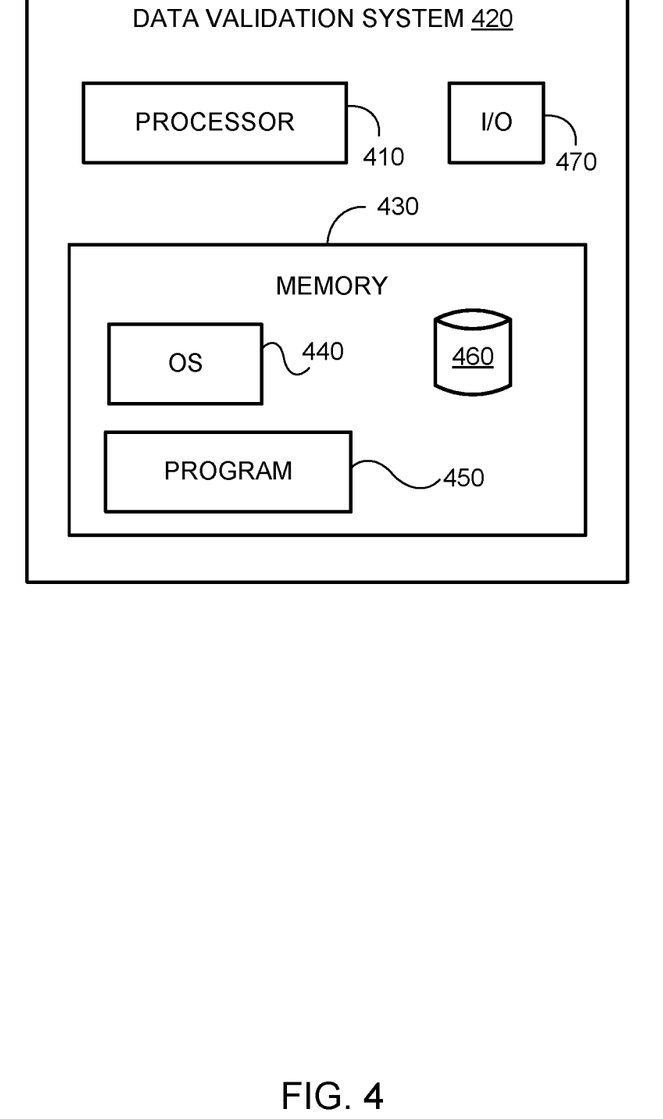
FIG. 4 is a component diagram of an example data validation system.

FIG. 4 is a component diagram of an example of the data validation system 420 that may be used to validate data records before storing the data records in a data store.

As shown, data validation system 420 may include a processor 410, an input/output ("I/O") device 470, a memory 430 containing an operating system ("OS") 440 and a program 450. For example, data validation system 420 may be a single device or server or may be configured as a distributed computer system including multiple servers, devices, or computers that interoperate to perform one or more of the processes and functionalities associated with the disclosed embodiments. In some embodiments, error message translation system 420 may further include a peripheral interface, a transceiver, a mobile network interface in communication with the processor 410, a bus configured to facilitate communication between the various components of error message translation system 420, and a power source configured to power one or more components of error message translation system 420.

A peripheral interface (not shown) may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver (not shown) may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface (not shown) may provide access to a cellular network, the Internet, a local area network, or another wide-area network. In some embodiments, a mobile network interface may include hardware, firmware, and/or software that allows the processor(s) 410 to communicate with other devices via wired or wireless networks, whether local or wide area, private or public, as known in the art. A power source may be configured to provide an appropriate alternating current (AC) or direct current (DC) to components requiring power.

Processor 410 may include one or more of a microprocessor, microcontroller, digital signal processor, co-processor or the like or combinations thereof capable of executing stored instructions and operating upon stored data. Memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 630.

Processor 410 may be one or more known processing devices, such as a microprocessor from the Pentium™ family manufactured by Intel™ or the Turion™ family manufactured by AMD™. Processor 410 may constitute a single core or multiple core processor that executes parallel processes simultaneously. For example, processor 410 may be a single core processor that is configured with virtual processing technologies. In certain embodiments, processor 410 may use logical processors to simultaneously execute and control multiple processes. Processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Data validation system 420 may include one or more storage devices configured to store information used by processor 410 (or other components) to perform certain functions related to the disclosed embodiments. In some embodiments, error message translation system 420 may include memory 430 that includes instructions to enable processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, data validation system 420 may include memory 430 that includes instructions that, when executed by processor 410, perform one or more processes consistent with the functionalities disclosed herein. Methods, systems, and articles of manufacture consistent with disclosed embodiments are not limited to separate programs or computers configured to perform dedicated tasks. For example, data validation system 420 may include memory 430 that may include one or more programs 450 to perform one or more functions of the disclosed embodiments. Moreover, processor 410 may execute one or more programs 450 located remotely.

Memory 430 may include one or more memory devices that store data and instructions used to perform one or more features of the disclosed embodiments. Memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 430 may include software components that, when executed by processor 410, perform one or more processes consistent with the disclosed embodiments. In some embodiments, memory 430 may include a database 460 for storing related data to enable data validation system 420 to perform one or more of the processes and functionalities associated with the disclosed embodiments.

Error message translation system 420 may also be communicatively connected to one or more memory devices (e.g., databases) locally or through a network. The remote memory devices may be configured to store information and may be accessed and/or managed by data validation system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Data validation system 420 may also include one or more I/O devices 470 that may comprise one or more interfaces for receiving signals or input from devices and providing signals or output to one or more devices that allow data to be received and/or transmitted by data validation system 420. For example, data validation system 420 may include interface components, which may provide interfaces to one or more input devices, such as one or more keyboards, mouse devices, touch screens, track pads, trackballs, scroll wheels, digital cameras, microphones, sensors, and the like, that enable data validation system 620 to receive data from one or more users.

In exemplary embodiments of the disclosed technology, data validation system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Figure 5:
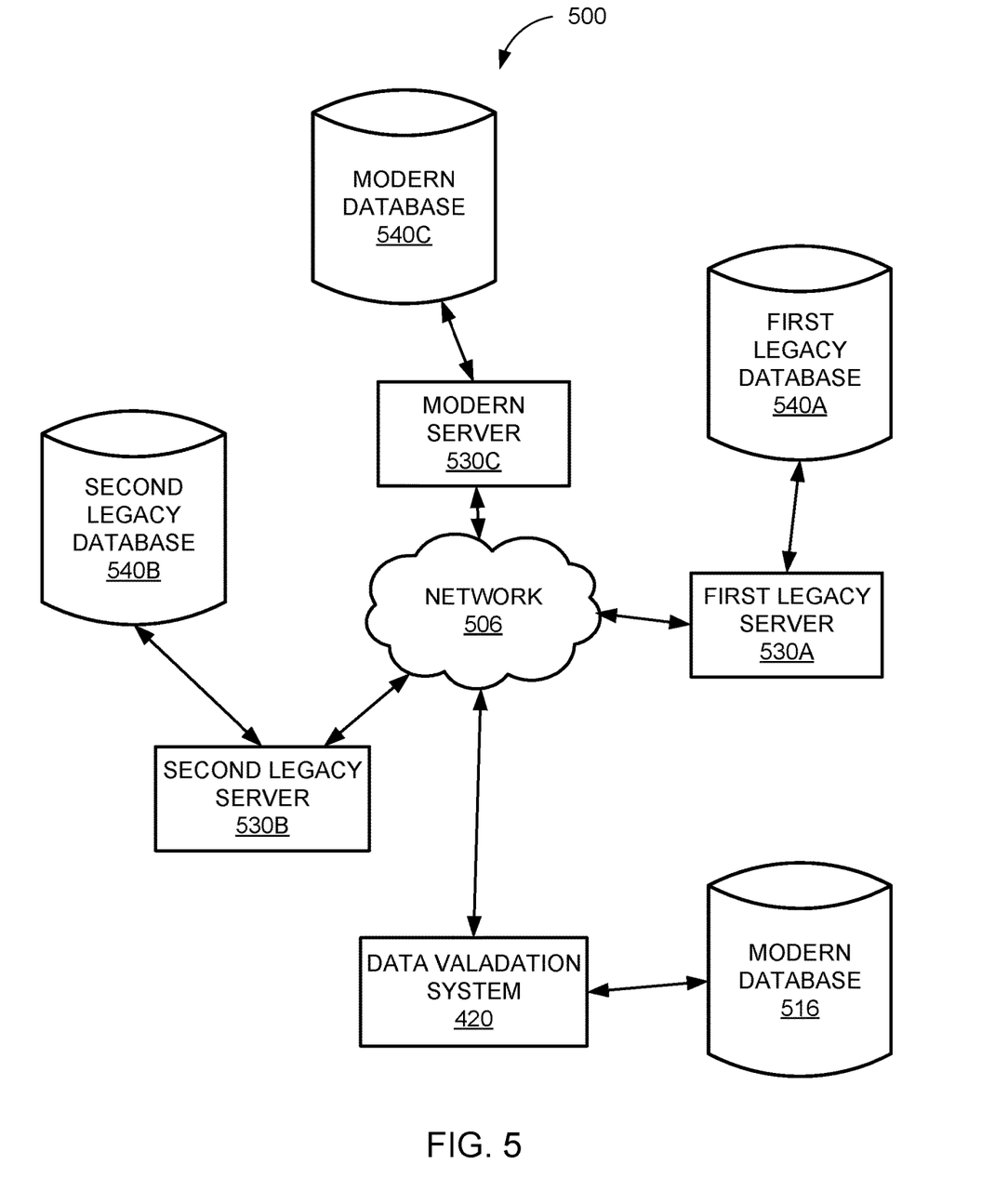
FIG. 5 is a diagram of an exemplary system for processing and storing data records that may be generated by or updated by legacy and modern systems.

FIG. 5 is an example block diagram of the system 500 that may be used to validate data records before storing them in a data store. The components and arrangements shown in FIG. 5 are not intended to limit the disclosed embodiments as the components used to implement the disclosed processes and features may vary. As system 500 may include a data validation system 420, a first legacy server 530A, a second legacy server 530B, and a modern server 530C configured to communicate over a network 506. First legacy server 530A, second legacy server 530B, and modern server 530C may have a similar structure as shown and described with respect to the data validation system 420 shown in FIG. 4 and may include many components that are similar to or even have the same capabilities as those described with respect to the data validation system 420.

In some embodiments, the data validation system 420 may interact with (e.g., receive data from) a first legacy database 540A via the first legacy server 530A. In some embodiments, the data validation system 420 may interact with (e.g., receive data from) a second legacy database 540B via the second legacy server 530B. In some embodiments, the data validation system 420 may interact with (e.g., receive data from) a modern database 540C via the modern server 530C. The first legacy database 540A may store first legacy data records (e.g., zip codes for addresses) generated or received by the first legacy server 530A. The second legacy database 540B may store second legacy data records (e.g., zip codes for addresses) generated or received by the second legacy server 530B. The modern datable 540C may store modern data records generated or received by the second legacy server 530C. In some embodiments, the data validation system 420 may call the first legacy server 530A, the second legacy server 530B, the modern server 530C, or a combination thereof to request data records for storage in the modern database 516.

Network 506 may be of any suitable type, including individual connections via the internet such as cellular or WiFi networks. In some embodiments, network 506 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 506 may comprise any type of computer networking arrangement used to exchange data. For example, network 506 may be the Internet, a private data network, virtual private network using a public network, and/or other suitable connection(s) that enables components in system 500 to send and receive information between the components of system 500. Network 506 may also include a public switched telephone network ("PSTN") and/or a wireless network.

Modern database 516 may be a database associated with data validation system 420 and may store a variety of information relating to legacy data records (e.g., zip codes, street names, address numbers, first name, last name) and modern data records (e.g., zip codes, street names, address numbers, first name, last name). Modern database 516 may also serve as a back-up storage device and may contain data and information that is also stored on, for example, local databases (e.g., modern database 540C) associated with modern server 530C and data validation system 420. Modern database 516 may be accessed by other devices or systems (e.g., data validation system 420).

First legacy database 540A may be a database associated with first legacy server 530A and may store a variety of information relating to legacy data records (e.g., zip codes, street names, address numbers, first name, last name). First legacy database 540A may contain legacy data records that are imported into the modern database 516 via data validation system 420 and/or first legacy server 530A. First legacy database 540A may be accessed by other devices or systems (e.g., data validation system 420 and/or first legacy server 530A).

Second legacy database 540B may be a database associated with second legacy server 530B and may store a variety of information relating to legacy data records (e.g., zip codes, street names, address numbers, first name, last name). Second legacy database 540B may contain legacy data records that are imported into the data validation database 516 via data validation system 420 and/or second legacy server 530B. Second legacy database 540B may be accessed by other devices or systems (e.g., data validation system 420 and/or second legacy server 530B).

Modern database 540C may be a database associated with the modern server 530C. This database may store a variety of information relating to modern data records (e.g., zip codes, street names, address numbers, first name, last name). These modern data records may be imported to the modern database 516 via the data validation system 420. In other embodiments, the modern database 540C is the same as the modern database 516.

Modern server 530C may be a system capable of creating or updating data records stored in the modern database 516. Modern server 530C may be accessed by other devices or systems.

While data validation system 420 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the data validation system 420 may include a greater or lesser number of components than those illustrated.

Although the preceding description describes various functions of data validation system 420, modern database 516, first legacy server 530A, first legacy database 540A, second legacy server 530B, second legacy database 540B, modern server 530C, modern database 540C, in some embodiments, some or all of these functions may be carried out by a single computing device.

Figure 6:
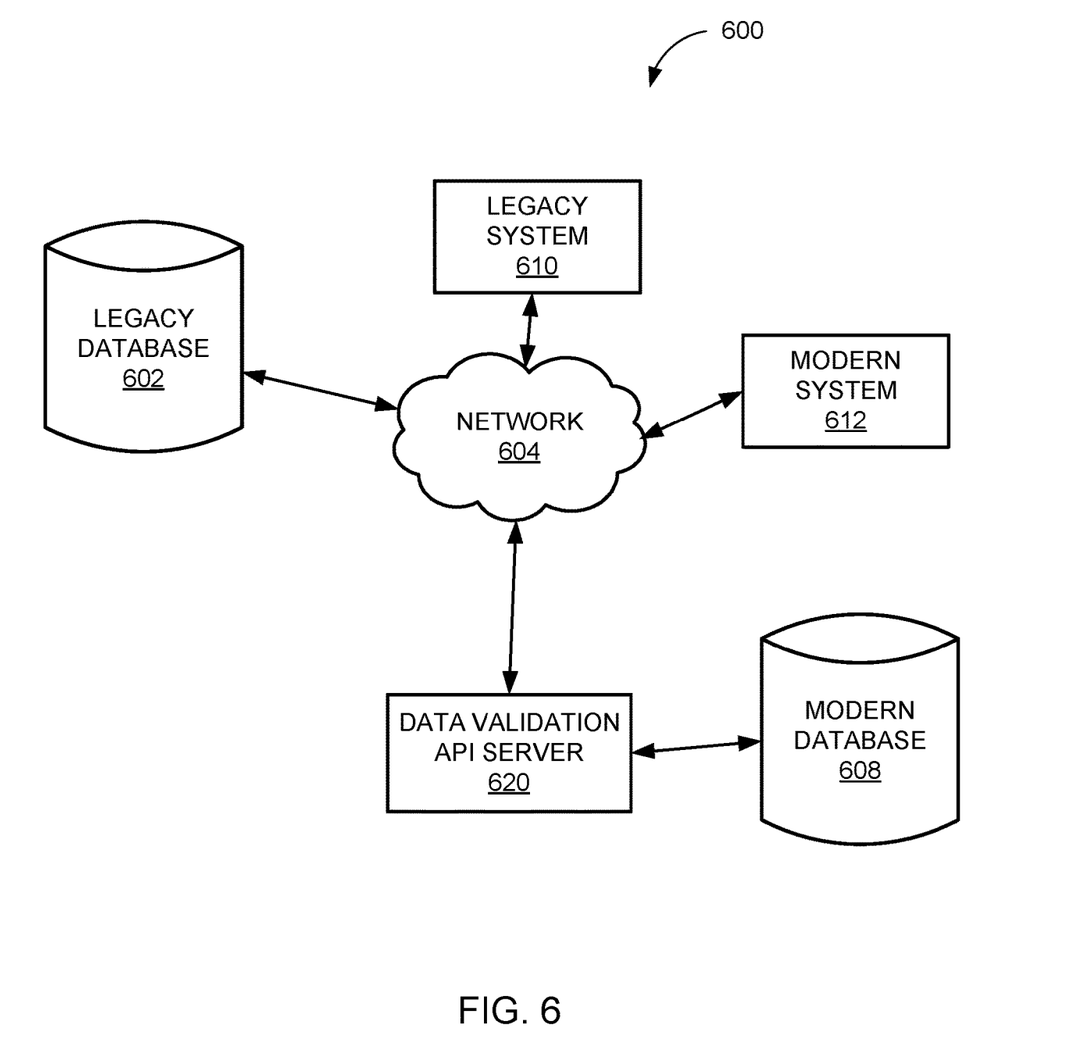
FIG. 6 is a further diagram of an exemplary system for processing and storing for processing and storing data records that may be generated by or updated by legacy and modern systems.

FIG. 6 is an example block diagram of the system 600 that may be used to validate data records before storing them in a data store. The components and arrangements shown in FIG. 6 are not intended to limit the disclosed embodiments as the components used to implement the disclosed processes and features may vary. As system 600 may include a data validation system 620 which may be an API server, zero or more legacy databases 602, zero or more legacy servers 610, zero or more modern systems 612, and a modern database 608 configured to communicate over a network 604. The zero or more legacy servers 610, and zero or more modern systems 612, may have a similar structure as shown and described with respect to the data validation system 420 shown in FIG. 4 and may include many components that are similar to or even have the same capabilities as those described with respect to the data validation system 420.

In some embodiments, the data validation system 620 may interact with (e.g., receive data from) one or more legacy databases 602. If so, the data validation API server 620 may perform the process described in FIG. 1 to either reject the record from the legacy database 602 or record it in the modern database 608 along with an indicator telling whether or not it satisfies all the validation rules. In some embodiments, the data validation system 620 may interact with (e.g., receive data from) one or more legacy systems 610 which will collect new records or perform updates to existing records. If so, the data validation API server 620 may perform the process described in FIG. 1 to either reject the new record or modification to a record from the legacy system 610 or record it in the modern database 608 along with an indicator telling whether or not it satisfies all the validation rules. In some embodiments, the data validation system 620 may interact with (e.g., receive data from) one or more modern systems 612 which will collect new records or perform updates to existing records. If so, the data validation API server 620 may perform the process described in FIG. 2 to either reject the new record or modification to a record from the legacy system 610 or record it in the modern database 608 along with an indicator telling that it satisfies all the validation rules.

Network 604 may be of any suitable type, including individual connections via the internet such as cellular or WiFi networks. In some embodiments, network 604 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 604 may comprise any type of computer networking arrangement used to exchange data. For example, network 604 may be the Internet, a private data network, virtual private network using a public network, and/or other suitable connection(s) that enables components in system 600 to send and receive information between the components of system 600. Network 604 may also include a public switched telephone network ("PSTN") and/or a wireless network.

Modern database 608 may be a database associated with data validation system 620 and may store a variety of information relating to each data record including any fields of the record as well as an indicator telling what level of validation the record satisfies. This indicator could take a variety of forms including, for example, a Boolean flag or an enumerated value. Modern database 608 may also serve as a back-up storage device and may contain data and information that is also stored on, for example, local databases (e.g., legacy database 602) or Modern database 608 could serve as a primary storage device and the same data and information it contains may also be backed up elsewhere (e.g. legacy database 602). Modern database 608 may be accessed by other devices or systems in addition to data validation API server 620, or data validation API server 620 may be the exclusive means for updating data in the modern database 608.

While data validation API server 620 has been described as being similar to data validation system 420 and as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the data validation API server 620 may include a greater or lesser number of components than those illustrated with respect to similar data validation system 620.

Although the preceding description describes various functions of data validation API server 620, modern database 608, legacy database 602, legacy system 610, and modern system 612, in some embodiments, some or all of these functions may be carried out by a single computing device.

Figure 7:
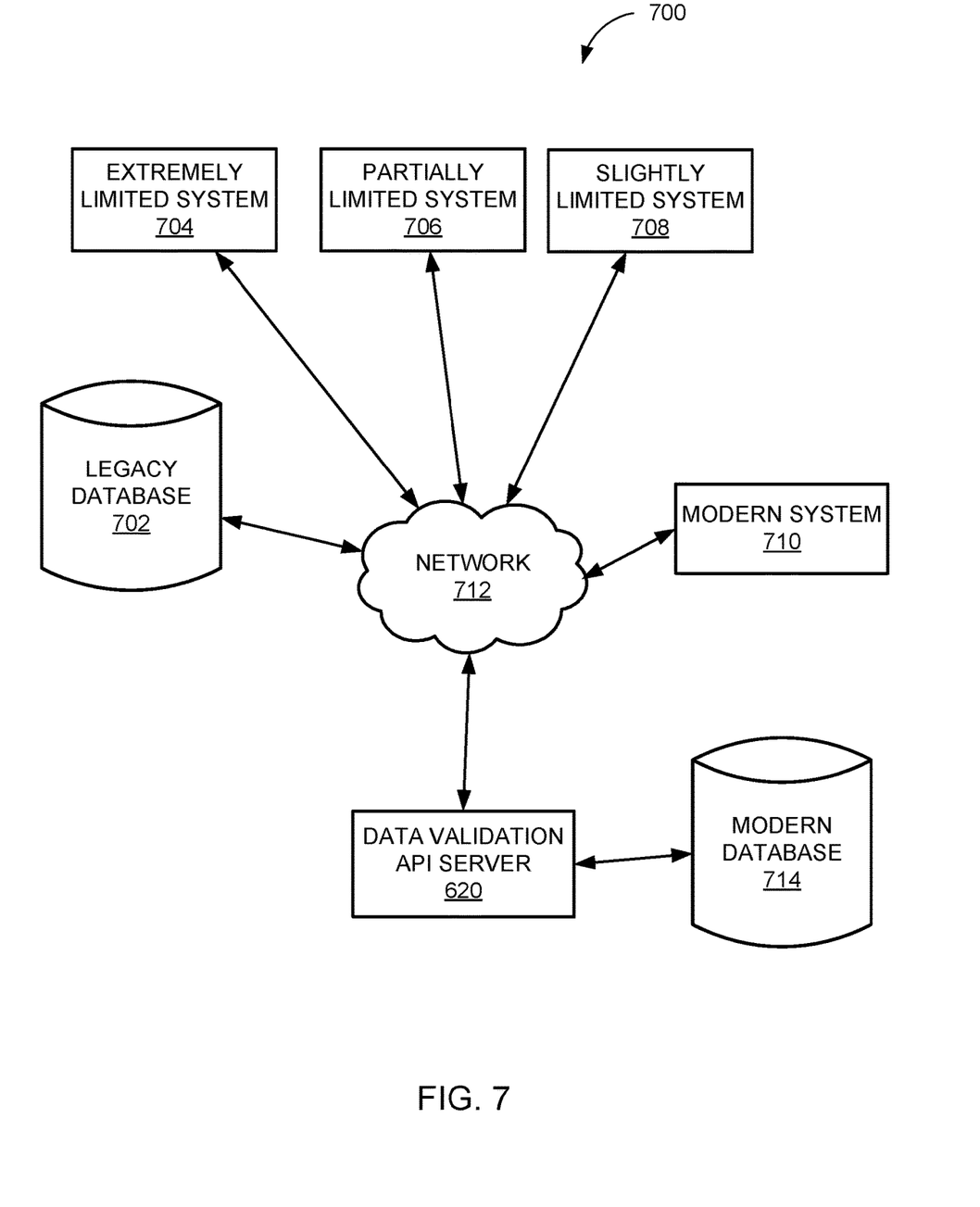
FIG. 7 is a further diagram of an exemplary system for processing and storing data records generated from systems with a variety of capabilities and applying multiple levels of validation before recording them in a data store.

FIG. 7 is an example block diagram of the system 700 that may be used to validate data records before storing them in a data store. The components and arrangements shown in FIG. 7 are not intended to limit the disclosed embodiments as the components used to implement the disclosed processes and features may vary. As system 700 may include a data validation API server 620 with similar components to data validation system 420 shown in FIG. 4, several systems or databases with varying capabilities for generating valid data records or valid updates to existing data records (702, 704, 706, 708, and 710), and a modern database 714 configured to communicate over a network 712. The several systems or databases (702, 704, 706, 708, 710), may have a similar structure as shown and described with respect to the data validation system 420 shown in FIG. 4 and may include many components that are similar to or even have the same capabilities as those described with respect to the data validation system 420.

In some embodiments, the data validation API server 620 may interact with (e.g., receive data from) several systems or databases with varying capabilities for generating valid data records or valid updates to existing data records (702, 704, 706, 708, and 710). If so, the data validation API server 620 may perform the process described in FIG. 2 to either reject the record or update to a record or to record it in the modern database 714 along with an indicator telling what level of validation rules it satisfies.

Network 712 may be of any suitable type, including individual connections via the internet such as cellular or WiFi networks. In some embodiments, network 712 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 712 may comprise any type of computer networking arrangement used to exchange data. For example, network 712 may be the Internet, a private data network, virtual private network using a public network, and/or other suitable connection(s) that enables components in system 700 to send and receive information between the components of system 700. Network 712 may also include a public switched telephone network ("PSTN") and/or a wireless network.

Modern database 714 may be a database associated with data validation API server 620 and may store a variety of information relating to each data record including any fields of the record as well as an indicator telling what level of validation the record satisfies. This indicator could take a variety of forms including, for example, an enumerated value. Modern database 714 may also serve as a back-up storage device and may contain data and information that is also stored on, for example, local databases (e.g., any of 702 through 710 which may be a database) or Modern database 714 could serve as a primary storage device and the same data and information it contains may also be backed up elsewhere (e.g., any of 702 through 710 which may be a database). Modern database 714 may be accessed by other devices or systems in addition to data validation API server 620, or data validation API server 620 may be the exclusive means for updating data in the modern database 714.

While data validation API server 620 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the data validation API server 620 may include a greater or lesser number of components than those illustrated in FIG. 4 associated with data validation system 420.

Although the preceding description describes various functions of data validation server 620, modern database 714, several systems or databases with varying capabilities for generating valid data records or valid updates to existing data records (702, 704, 706, 708, and 710), in some embodiments, some or all of these functions may be carried out by a single computing device.

Exemplary Use Cases

The following exemplary use cases describe examples of a typical user flow pattern. They are intended solely for explanatory purposes and not in limitation.

In one exemplary use case, a company may want to update to a new data store using a data validation system 420 that works with a modern application running on a modern server 530C that generates modern data records (e.g., customer records) but also imports legacy data records (e.g., customer records) from a legacy database (e.g., first legacy database 540A). The data validation system 420 holds the modern data records a high standard before they are stored in the new data store (e.g., modern database 516) but the data validation system 420 holds the legacy data records to a low data standard to ensure that most of the legacy data records can be imported to modern database 516.

More specifically, the data validation system 420 may receive a legacy data record (e.g., a customer record) from the first legacy server 530A, which may in turn receive the legacy data record form the first legacy database 540A. The data validation system 420 may determine whether the legacy data record satisfies a first validation rule (e.g., the zip code field in the address of a customer record must contain only digits in the zip code field for an address). In cases where the legacy data record fails to satisfy the first validation rule (e.g., the zip code field contains letters or symbols), the data validation system 420 may reject the legacy data record for storage in the data store (e.g., modern database 516). Furthermore, in cases where the legacy data record satisfies the first validation rule (e.g., the zip code field only contains digits), the data validation system 420 may determine whether the legacy data record satisfies a second validation rule (e.g., the zip code field must be a valid zip code for the state given in the state field of the address). In cases where the legacy data record fails to satisfy the second validation rule, the data validation system 420 may store the legacy data record in the data store (e.g., the modern database 516) with an indicator to record that the legacy data record does not satisfy the second validation rule. In cases where the legacy data record satisfies the second validation rule, the data validation system 420 may store the legacy data record in the data store (e.g., the modern database 516) with an indicator to record that it does satisfy the second validation rule. Thus, the legacy data record must satisfy a basic standard (e.g., containing digits in a zip code field entry) but does not have to satisfy the high standard (e.g., containing a zip code that is a valid zip code for the state in the state field of the address) to be stored in the data store. This may be useful because the legacy database may contain records that do not satisfy the standards of the second validation rule (e.g., the legacy database contains records with invalid zip codes) or because the legacy server is not capable of enforcing those standards (e.g., the legacy database is not capable of validating whether a zip code is assigned to a particular state).

In contrast, the data validation system 420 holds modern data records to a higher standard such that they must satisfy both the first and second validations rule to be stored in the data store. Specifically, the data validation system 420 may receive a modern data record from a modern data source (e.g., modern server 530C). The data validation system 420 may determine whether the modern data record satisfies the first validation rule (e.g., legacy data records must contain only digits in the zip code field of an address). In cases where the modern data record fails to satisfy the first validation rule (e.g., the zip code field entry contains letters or symbols), the data validation system 420 may reject the modern data record for storage in the data store (e.g., data validation database 516). Furthermore, in cases where the modern data record satisfies the first validation rule (e.g., the zip code field entry only contains digits), the data validation system 420 determines whether the modern data record satisfies the second validation rule (e.g., the zip code field must be a valid zip code for the state in the state field of the address). In cases where the modern data record fails to satisfy the second validation rule (e.g., the zip code entry is not in use by the USPS or is not assigned to the state the address is located in), the data validation system 420 may reject the modern data record for storage in the data store. However, in cases where the modern data record satisfies the second validation rule (e.g., the zip code field entry contains nine digits), the data validation system 420 may store the modern data record in the data store. Thus, the modern data record must satisfy the basic standard (e.g., containing digits in a zip code field entry) as well as the high standard (e.g., containing a zip code entry that is valid for the state) to be stored in the data store. Accordingly, the described systems and methods solve the technical problem of previously being unable to hold modern data records to stricter standards while simultaneously rapidly integrating into the same data store legacy data that cannot satisfy the stricter standards and allowing ongoing updates from legacy systems that cannot satisfy these stricter standards. Systems capable of satisfying a higher standard can be held to it while systems not capable of satisfying it are still able to integrate and an indicator identifies which records meet the higher standard.

To perform these various exemplary use cases, in some examples, the system may include one or more processors and a memory in communication with the one or more processors and storing instructions that, when executed by the one or more processors, are configured to cause the system to perform steps of a method. The method may include receiving a legacy data record which may be a new record or an update to an existing data record from a legacy data source and determining whether the legacy data record satisfies a first validation rule. In cases where the legacy data record fails to satisfy the first validation rule, the method may include rejecting the legacy data record for storage in a data store. In cases where the legacy data record satisfies the first validation rule, the method may include determining whether the legacy data record satisfies a second validation rule. In cases where the legacy data record fails to satisfy the second validation rule, the method may include storing the legacy data record with an indicator to record that the legacy data record does not satisfy the second validation rule in the data store. In cases where the legacy data record satisfies the second validation rule, the method may include storing the legacy data record in the data store with an indicator that the data record satisfies all validation rules. The method may include receiving a modern data record from a modern data source and determining whether the modern data record satisfies the first validation rule. In cases where the modern data record fails to satisfy the first validation rule, the method may include rejecting the modern data record for storage in the data store. In cases where the modern data record satisfies the first validation rule, the method may include determining whether the modern data record satisfies the second validation rule. In cases where the modern data record fails to satisfy the second validation rule, the method may include rejecting the modern data record for storage in the data store. In cases where the modern data record satisfies the second validation rule, the method may include storing the modern data record in the data store with an indicator that the data record satisfies all validation rules.

In the method, the legacy data record may be imported from the legacy data source or a legacy data record may be created by a legacy server (e.g., a new application taken directly from a customer), or a legacy data record may be an update to an existing record that is performed by a legacy server.

In the method, the modern data source may be a modern data application and the modern data record may be received from the modern data application. As with records from the legacy system, it the modern data record may consist of a newly created record (e.g., a new application taken directly from a customer), or the modern data record may be an update to an existing record that is performed by the modern server 530.

In another exemplary use case, a company may have an existing database of US customer records 702, some of which do not do not meet desired standards (e.g., they may have addresses with invalid zip codes). The company may also have a legacy customer servicing system 706 which can accept new customer applications or modify existing customer records and which is capable of performing basic validity checks (e.g., it can verify the zip code of an address against the list of valid USPS zip codes for that state). The company may also have a modern customer servicing system 710 which can accept new customer applications or modify existing customer records and which is capable of performing extensive validity checks (e.g., it can run an address through a full list of USPS addresses correcting any errors and populating a valid ZIP+4 for any address). The company may desire to begin using a new data store, modern database 714 accessed via a data validation API server 620, and may desire that the data validation API server 620 enforce rigorous data standards (e.g., that all addresses be validated against the full list of USPS addresses and have a full and accurate zip+4 populated), but that the modern database 714 still be able to operate with the legacy database 702 and legacy customer servicing system 706. Indeed, there may be several intermediate systems (704, 706, 708) with intermediate levels of capability, all of which are desired to access modern database 714 using API server 620 to enforce compliance with whatever level of validation each system is capable of supporting.

By configuring the data validation API server 620 as described in this invention, so that the data validation API server 620 implements process 300, the company will be able to meet these needs. Validation rules may be organized into multiples levels (e.g., level 0 might be that the zip code contain only digits, no other characters, level 1 might be that the zip code be valid for the US state the address is in, level 2 might be that the entire address has been verified against the USPS list of addresses and that the full zip+4 be populated accurately).

The data validation API server 620 may receive existing records from the legacy database 702 and may compare each record against the rulesets in order, beginning with level 0 and proceeding to level 2 until the record fails to satisfy some validation ruleset. In cases where the highest level (e.g., level 2) of the rulesets is reached and is satisfied (308→312) the record may be stored in the modern database 714 along with a quality indicator of the highest level (e.g., 2). In cases where the lowest level of rules (e.g., level 0) is not satisfied (318→320), the record may be rejected by the API. And in cases where the record fails to satisfy some ruleset (e.g., level 1 or 2) that is beyond the capabilities of the legacy database 702 (318→312), the record may be recorded in the modern database 714 along with a quality indicator describing the highest level of ruleset it satisfied (e.g., 0 or 1).

The data validation API server 620 may receive new customer records or updates to existing customer records from the legacy system 706 and may compare each record against the rulesets in order, beginning with level 0 and proceeding to level 2 until the record fails to satisfy some validation ruleset. In cases where the highest level (e.g., level 2) of the rulesets is reached and is satisfied (308→312) the record may be stored in the modern database 714 along with a quality indicator of the highest level (e.g., 2). In cases where some level of rules the legacy system 706 should be able to support (e.g., level 0 or 1) is not satisfied (318→320), the record may be rejected by the API. And in cases where the record fails to satisfy some ruleset (e.g., level 2) that is beyond the capabilities of the legacy system 706 (318→312), the record may be recorded in the modern database 714 along with a quality indicator describing the highest level of ruleset it satisfied (e.g., 1).

Finally, the data validation API server 620 may receive new customer records or updates to existing customer records from the modern system 710 and may compare each record against the rulesets in order, beginning with level 0 and proceeding to level 2 until the record fails to satisfy some validation ruleset. In cases where the highest level (e.g., level 2) of the rulesets is reached and is satisfied (308→312) the record may be stored in the modern database 714 along with a quality indicator of the highest level (e.g., 2). In cases where some level of rules the modern system 710 should be able to support (e.g., level 0, 1, or 2) is not satisfied (318→320), the record may be rejected by the API.

As a result of this process, each database or system (702, 706, 710) may create records or modify existing records in the modern database 714, and the data validation API server 620 will enforce the standards each is capable of meeting. Furthermore, each record in the modern database 714 will be accompanied by an indicator telling the level validation it satisfies so that records which do not meet higher standards can be easily identified.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

As used in this application, the terms "component," "module," "system," "server," "processor," "memory," and the like are intended to include one or more computer-related units, such as, but not limited to, hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology that are described above with reference to user devices may include mobile computing devices. Those skilled in the art recognize that there are several categories of mobile devices, generally known as portable computing devices, that can run on batteries but are not usually classified as laptops. For example, mobile devices can include, but are not limited to, portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
   one or more processors; and
   a memory in communication with the one or more processors and storing instructions that, when executed by the one or more processors, are configured to cause the system to:
      receive one or more legacy data records from a legacy data source;
      assign a respective first data quality level to each of the one or more legacy data records;
      determine whether each legacy data record satisfies a respective first set of validation rules, the respective first set of validation rules based on the assigned respective first data quality level;
      when a legacy data record fails to satisfy the respective first set of validation rules, reject the legacy data record for storage in a data store;

when the legacy data record satisfies the respective first set of validation rules:
  assign a respective second data quality level to each of the one or more legacy data records;
  determine whether the legacy data record satisfies a respective second set of validation rules, the respective second set of validation rules based on the assigned respective second data quality level;
  when the legacy data record fails to satisfy the respective second set of validation rules, store the legacy data record in the data store with an indicator that indicates the legacy data record does not satisfy the respective second set of validation rules; and
  when the legacy data record satisfies the respective second set of validation rules, store the legacy data record in the data store with the indicator that indicates the legacy data record does satisfy the respective first set of validation rules and the respective second set of validation rules;
receive one or more modern data records from a modern data source;
assign a respective third data quality level to each of the one or more modern data records;
determine whether each modern data record satisfies a respective third set of validation rules, the respective third set of validation rules based on the assigned respective third data quality level;
when a modern data record fails to satisfy the respective third set of validation rules, reject the modern data record for storage in the data store; and
when the modern data record satisfies the respective third set of validation rules:
  assign a respective fourth quality data level to each of the one or more modern data records;
  determine whether the modern data record satisfies a respective fourth set of validation rules, the respective fourth set of validation rules based on the assigned respective fourth data quality level;
  when the modern data record fails to satisfy the respective fourth set of validation rules, reject the modern data record for storage in the data store; and
  when the modern data record satisfies the respective fourth set of validation rules, store the modern data record in the data store with the indicator that indicates the modern data record does satisfy of the respective third set of validation rules and the respective fourth set of validation rules,
    wherein the respective second data quality level is higher than the respective first data quality level; and
    wherein the respective fourth data quality level is higher than the respective third data quality level.

2. The system of claim 1, wherein the one or more legacy data records and the one or more modern data records are updates to existing records of the data store.

3. The system of claim 1, wherein the one or more legacy data records and the one or more modern data records are new records that do not exist in the data store.

4. The system of claim 1, wherein each legacy data record and each modern data record is either a new record that does not exist in the data store or an existing record of the data store.

5. The system of claim 1, wherein the system receiving the one or more legacy data records and the one or more modern data records and determining whether each legacy data record and each modern data record satisfies the respective first set of validation rules, the respective second set of validation rules, the respective third set of validation rules, and/or the respective fourth set of validation rules is an API server providing access to the data store.

6. The system of claim 2, wherein the system receiving the one or more legacy data records and the one or more modern data records and determining whether each legacy data record and each modern data record satisfies the respective first set of validation rules, the respective second set of validation rules, the respective third set of validation rules, and/or the respective fourth set of validation rules is an API server providing access to the data store.

7. The system of claim 3, wherein the system receiving the one or more legacy data records and the one or more modern data records and determining whether each legacy data record and each modern data record satisfies the respective first set of validation rules, the respective second set of validation rules, the respective third set of validation rules, and/or the respective fourth set of validation rules is an API server providing access to the data store.

8. The system of claim 4, the system receiving the one or more legacy data records and the one or more modern data records and determining whether each legacy data record and each modern data record satisfies the respective first set of validation rules, the respective second set of validation rules, the respective third set of validation rules, and/or the respective fourth set of validation rules is an API server providing access to the data store.

9. The system of claim 1, wherein the one or more modern data records and the one or more legacy data records are received substantially simultaneously.

* * * * *